US012756619B2

(12) United States Patent
Kannan

(10) Patent No.: US 12,756,619 B2
(45) **Date of Patent: *Oct. 6, 2026**

(54) PREEMPTIVE NETWORK REMEDIATION OF WIRELESS NETWORK ISSUES WITH ARTIFICIAL INTELLIGENCE TO PREVENT USER SWITCHES TO WIRED NETWORKS

(71) Applicant: Fortinet, Inc., Sunnyvale, CA (US)

(72) Inventor: Venkatesh Kannan, Bangalore (IN)

(73) Assignee: Fortinet, Inc., Sunnyvale, CA (US)

( * ) Notice: Subject to any disclaimer, the term of this patent is extended or adjusted under 35 U.S.C. 154(b) by 59 days.

This patent is subject to a terminal disclaimer.

(21) Appl. No.: 18/894,191

(22) Filed: Sep. 24, 2024

(65) Prior Publication Data

US 2025/0088413 A1 Mar. 13, 2025

Related U.S. Application Data

(63) Continuation of application No. 18/125,926, filed on Mar. 24, 2023, now Pat. No. 12,206,544.

(51) Int. Cl.

| | |
|---|---|
| ***H04L 41/0663*** | (2022.01) |
| ***H04L 41/0659*** | (2022.01) |
| ***H04L 41/0816*** | (2022.01) |
| ***H04L 41/0823*** | (2022.01) |

(52) U.S. Cl.

CPC ...... *H04L 41/0663* (2013.01); *H04L 41/0661* (2023.05); *H04L 41/0816* (2013.01); *H04L 41/0836* (2013.01)

(58) Field of Classification Search

CPC ............. H04L 41/0663; H04L 41/0659; H04L 41/0816; H04L 41/0836

See application file for complete search history.

(56) References Cited

U.S. PATENT DOCUMENTS

2015/0373574 A1* 12/2015 Gordon ................ H04W 24/08 370/252
2023/0066525 A1* 3/2023 Cabanas ............... H04W 4/029
2023/0245156 A1* 8/2023 Cella ...................... B25J 9/1682 705/7.35
2023/0247077 A1* 8/2023 Yu ....................... H04L 65/1104 348/14.03

(Continued)

FOREIGN PATENT DOCUMENTS

CN 104768198 A * 7/2015 ............ H04W 36/30
CN 108023748 A * 5/2018 ......... H04L 41/0663

(Continued)

*Primary Examiner* — Richard G Keehn

(74) *Attorney, Agent, or Firm* — Law Office of Dorian Cartwright; Dorian Cartwright

(57) ABSTRACT

A change of a user device from a wireless connection to the enterprise network to a wired connection to the enterprise network (or a cellular network) is detected. In response, a snapshot of network conditions relevant to the user device are detected. A health check on the network conditions can identify specific network issues negatively affecting the user device and the issues are remediated. A remediation model is generated with AI that a different user change will occur based on a later health check revealing similar network conditions to the earlier health check. In response, the issues are automatically remediating the specific network issues based on the earlier stored remediation the earlier.

7 Claims, 5 Drawing Sheets

(56) References Cited

U.S. PATENT DOCUMENTS

| | | | | |
|---|---|---|---|---|
| 2023/0261955 A1* | 8/2023 | Mitra | .................... | H04L 41/147<br>709/224 |

FOREIGN PATENT DOCUMENTS

| | | | | | |
|---|---|---|---|---|---|
| CN | 112333013 | A | * | 2/2021 | ......... H04L 41/0816 |
| CN | 109769280 | B | * | 10/2021 | |
| CN | 114205317 | A | * | 3/2022 | ........... H04L 41/145 |
| CN | 115529221 | A | * | 12/2022 | ......... H04L 12/4641 |
| WO | WO-2013112193 | A1 | * | 8/2013 | ............ H04W 36/08 |

* cited by examiner

PREEMPTIVE NETWORK REMEDIATION OF WIRELESS NETWORK ISSUES WITH ARTIFICIAL INTELLIGENCE TO PREVENT USER SWITCHES TO WIRED NETWORKS

RELATED APPLICATIONS

This application is a continuation of U.S. application Ser. No. 18/125,926, filed on Mar. 24, 2023, which is incorporated herein by reference in its entirety.

FIELD OF THE INVENTION

The invention relates generally to computer networks, and more specifically, to preemptively remediate a wireless network with artificial intelligence based on past user behavior to prevent a user switch to a wired or a cellular network.

BACKGROUND

In a network deployment with both wired and wireless connections, if wireless experience is not good some users will move from wireless to wired, without reporting issues. Wireless stats or data collected using network management software might indicate no issues, but users who moved to wired might have faced issue during that time. Some user issues include poor signal strength or loss of signal, choppy voice calls, and the like. As a result, the problems are not addressed, and users will continue to have a poor experience What is needed is a robust technique for preemptively remediating a wireless network with artificial intelligence based on a model of user behavior to reduce poor user experience resulting in switches from wireless to wired or cellular connections.

SUMMARY

To meet the above-described needs, methods, computer program products, and systems for preemptively remediating a wireless network with artificial intelligence based on user behavior.

In one embodiment, a change of a user device from a wireless connection to the enterprise network to a wired connection to the enterprise network is detected. In response, a snapshot of network conditions relevant to the user device are detected. A health check on the network conditions can identify specific network issues negatively affecting the user device and the issues are remediated.

In another embodiment, at a subsequent time, a change is predicted based on similar network conditions. In response, the issues are automatically remediating the specific network issues based on the earlier stored remediation the earlier health.

Advantageously, network performance and computer performance are improved with better wireless performance.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, computer program products, and systems for preemptively remediating a wireless network with artificial intelligence based on user behavior, to prevent a user switch from a wireless to a wired connection. One of ordinary skill in the art will recognize many alternative embodiments that are not explicitly listed based on the following disclosure.

I. Systems for Machine Learning Preemptive Remediation (FIGS. 1-2)

Figure 1:
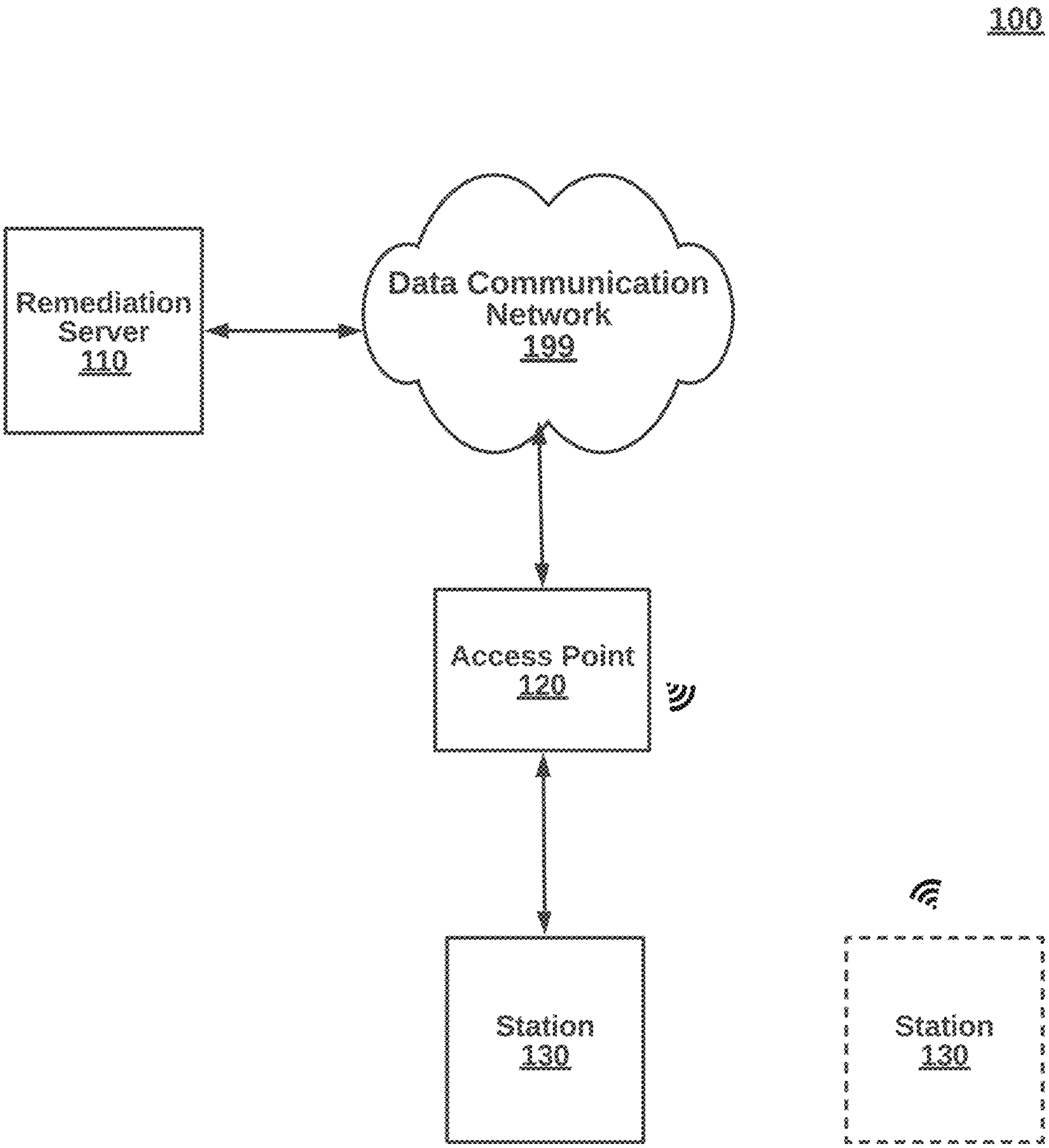
FIG. 1 is a high-level block diagram illustrating a system for preemptively remediating a wireless network with artificial intelligence based on user behavior, according to one embodiment.
Figure 2:
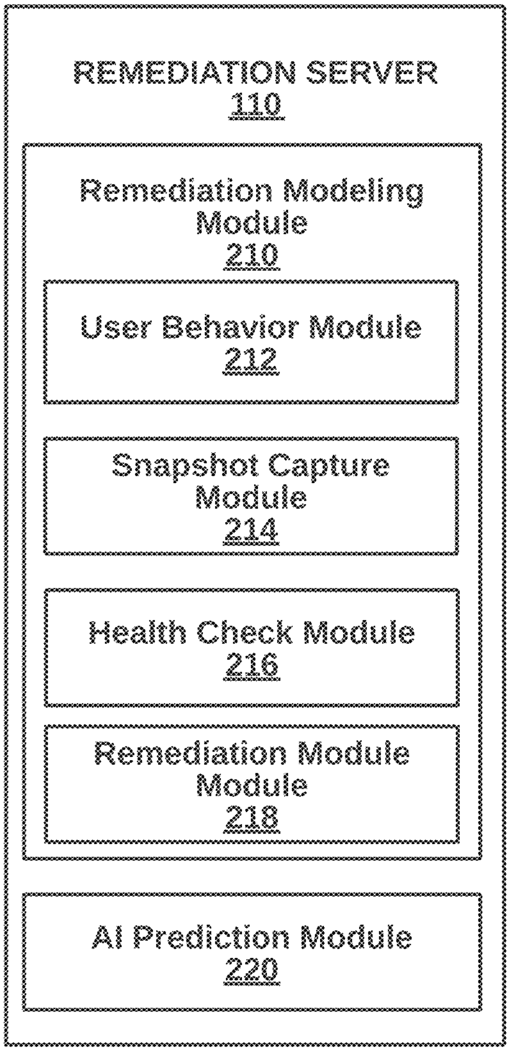
FIG. 2 is a more detailed block diagram illustrating a remediation server of the system of FIG. 1, according to one embodiment.

FIG. 1 is a high-level block diagram illustrating a system 100 for preemptively remediating a wireless network with artificial intelligence based on user behavior, according to one embodiment. The system 100 includes a remediation server 110, an access point 120 and a station 130. Other embodiments of the system 100 can include additional components that are not shown in FIG. 1, such as controllers, network gateways, firewalls, and additional access points and stations. The components can be implemented in hardware, software, or a combination. An example implementation of the components is shown in FIG. 6.

In one embodiment, the components of the automatic system 100 are coupled in communication over a private network connected to a public network, such as the Internet. In another embodiment, system 100 is an isolated, private network. The components can be connected to the data communication system via hard wire (e.g., remediation server 110 and access point 120). The components can also be connected via wireless networking (e.g., station 130). The data communication network can be composed of any data communication network such as an SDWAN, an SDN (Software Defined Network), WAN, a LAN, WLAN, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802.11r, 802.11be, Wi-Fi 6, Wi-Fi 6E, Wi-Fi 7 and the like. Components can use IPV4 or IPV6 address spaces.

The remediation server 110 remediates wireless issues based on anticipating user behavior of switching from a wireless connection to a wired connection. A model is generated from historical user behavior of switching connections. In turn, the remediation server 110 leverages the model for identifying similar circumstances and predicting a potential switch. By remediating the wireless issue ahead of time, the switch may be avoided. Another type of switch that can indicate issues with Wi-Fi is a change from a wireless Wi-Fi connection to a cellular connection.

The remediation server 110 can be a separate physical device on the enterprise network as shown in FIG. 1. Alternatively, the remediation server 110 can be integrated with other network devices, such as the access point 120, a Wi-Fi controller, or other network device on the enterprise network. In still another embodiment, the remediation server 110 can be located on the cloud, external to the enterprise network, and be operated by a third party. Additional embodiments of the remediation server 110 are set forth below with respect to FIG. 2.

The access point 120 provides a wireless connection to the station 130 and other stations to a backbone wired network. Various conditions at the access point 120 can cause a user to switch connections. For example, a large number of additional stations connecting to the access point 120 can degrade performance to the access point 130. Also, SSI strength of a connection can vary based on interference and movement of the station 130. In another example, a processor load, a memory load, a number of packets in queue, a throughput, or other conditions can also affect performance to the station 130. Some batch operations are set to run periodically, for example, a restart or device maintenance operations may be set to occur daily at midnight or monthly and can be disruptive.

Remediations for the access point 120 can include offloading wireless connections, rescheduling batch operations, updating network policies, and the like. The remediations can be manually implemented by network administrators or be automatically performed by the access point 120 or an outside managing device.

Other network devices can indirectly degrade wireless performance and can also have remediations that directly or indirectly improve wireless performance. A Wi-Fi controller implements policies on the access point 120, such as packet forwarding for implementing a network policy, that can be temporarily suspended to rebound wireless performance. A firewall may adjust specific network policies enforced on wireless network devices. In one embodiment, network devices can change prioritization of wireless network packets in order to speed up processing times. A network gateway or a network manager, in an embodiment, implements policies in coordination across several managed devices to affect overall wireless performance.

The station 130 connects to the enterprise network either wirelessly or by wire. Some conditions of the station 130, rather than with the network, can cause a change, such as low power, high mobility, structural interference, and using too many applications at the same time. wireless connection is initiated by the station 130 after selecting an access point from those within range, as indicated by beacons continually broadcast by access points to advertise availability for connections. To complete a connection, the station 130 and the access point complete a protocol of authentication and association. In an embodiment with multiple access points, the station 130 can roam between access points based on physical movement with soft handoffs.

FIG. 2 is a more detailed block diagram illustrating the remediation server 110 of the system of FIG. 1, according to one embodiment. The network device 110 includes a remediation modeling module 210 and an AI prediction module 220. The remediation modeling module 210 further includes a user behavior module 212, a snapshot capture module 214, a health check module 216 and a remediation module 218. The components can be implemented in hardware, software, or a combination of both.

The user behavior module 210 detects a change of a user device from a wireless connection to the enterprise network to a wired connection to the enterprise network. One way to detect the change is to track a device or track a user over a window of time. The same device connected wirelessly may be plugged into an Ethernet port within the window. Additionally, the same user logged into a wireless device may log out and then log into a wired device within the window. The user behavior module 210 can listen to events, identify wireless disconnections, and cache the events for the window of time while checking for connection events that match. In another embodiment, a change to a cellular network is detected. For example, a daemon on the device can send a notification or cellular data packets can be sniffed and recognized as a new session from the same device that was previously connected to a wireless network. In another example, the access point 120 itself includes a cellular transceiver that receives cellular packets for detection.

The snapshot capture module 212, responsive to the detection, generates a snapshot of network conditions, or user device conditions, relevant to the user behavior. In one embodiment, when a switch is detected, the snapshot capture module 220 can record known network conditions and device statuses. Also, network devices can be interrogated for snapshot data. In another embodiment, a daemon on the station 120 can detect the switch and automatically upload snapshot data. For instance, a user laptop may be low on battery and affect performance.

The health check module 214 can perform a health check on the network condition snapshot to identify specific network issues negatively affecting the user device. Using a combination of the snapshot data, the health check module 230 can identify related issues from a database. In one case, wireless network interference is identified, overloaded hardware, a large number of connected stations, or a need for software updates can also be detected.

The remediation module 216 records manual and automated solutions associated with the specific network issues. Remediation can include changing policies, offloading, notifying a network administrator, forcing station handoffs, reconfiguring channels to reduce interference, changing hardware or software configurations, and numerous other solutions. Remediations can vary depending on network architecture, time of day, network conditions, and other aspects. In an embodiment, the remediation is stored as a solution and used as input to a training model. In the instance of low user battery, a user can be prompted to plug-in a laptop or smartphone to prevent a bad user experience leading to a switch.

The AI prediction module 218 generates a remediation model with AI that a different user change will occur based on a later health check revealing similar network conditions to the earlier health check. One embodiment uses a recursive neural network, stochastic process modeling, or other types of machine learning. The remediation module 240, responsive to the prediction, automatically addresses the specific network issues based on the earlier stored resolutions. In one embodiment, a model for remediation is generated from past solutions to past conditions. Some remediations are interpolated by AI for conditions that are not part of the training data. Later, responsive to the AI detecting the same or similar conditions, remediation can occur to improve a user experience and prevent switching.

Statistics can be tracked as to whether a user switch occurs or not after remediation, and used as feedback for tuning the remediation model. One embodiment invites a use to switch back to the wireless network along with a notification that a remediation has occurred. If the user follows up with a change back to the wireless network for a sustained period of time, the remediation model is updated.

II. Methods for Machine Leaning Preemptive Remediation (FIGS. 4-5)

Figure 3:
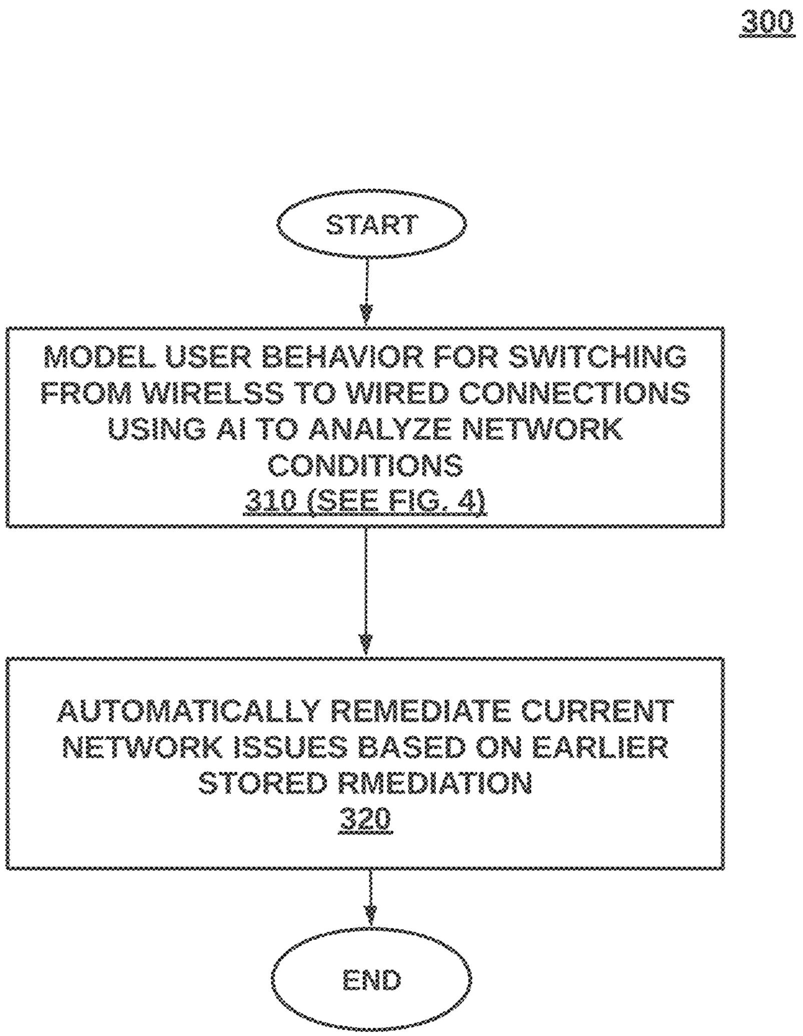
FIG. 3 is a high-level diagram illustrating a method 300 for preventing users from switching from wireless to wired connections, according to an embodiment.

FIG. 3 is a high-level diagram illustrating a method 300 for preventing users from switching from wireless to wired connections, according to an embodiment. The grouping of functionalities can vary as well as the order of steps for the methods described herein. The method 300 can be implemented by, for example, system 100 of FIG. 1.

At step 310, user behavior for switching form wireless to wired connections is modeled using AI to analyze network conditions, according to an embodiment, as described in FIG. 4 below. At step 320, automatically remediating current network issues based on the earlier stored remediation.

Figure 4:
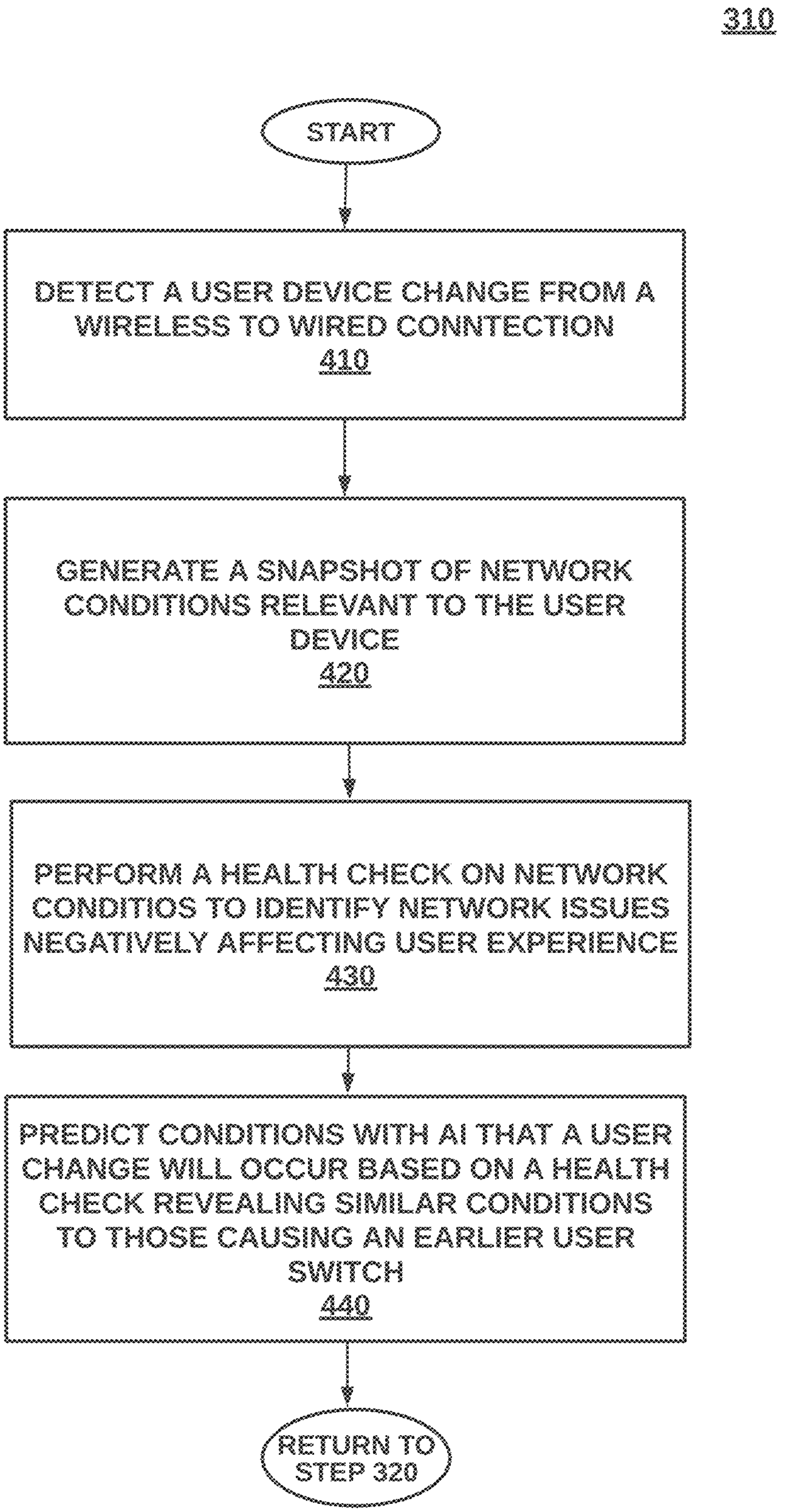
FIG. 4 is a more detailed flow diagram illustrating a method for preemptively remediating a wireless network with artificial intelligence based on user behavior, of the method of FIG. 3, according to one embodiment.
Figure 5:
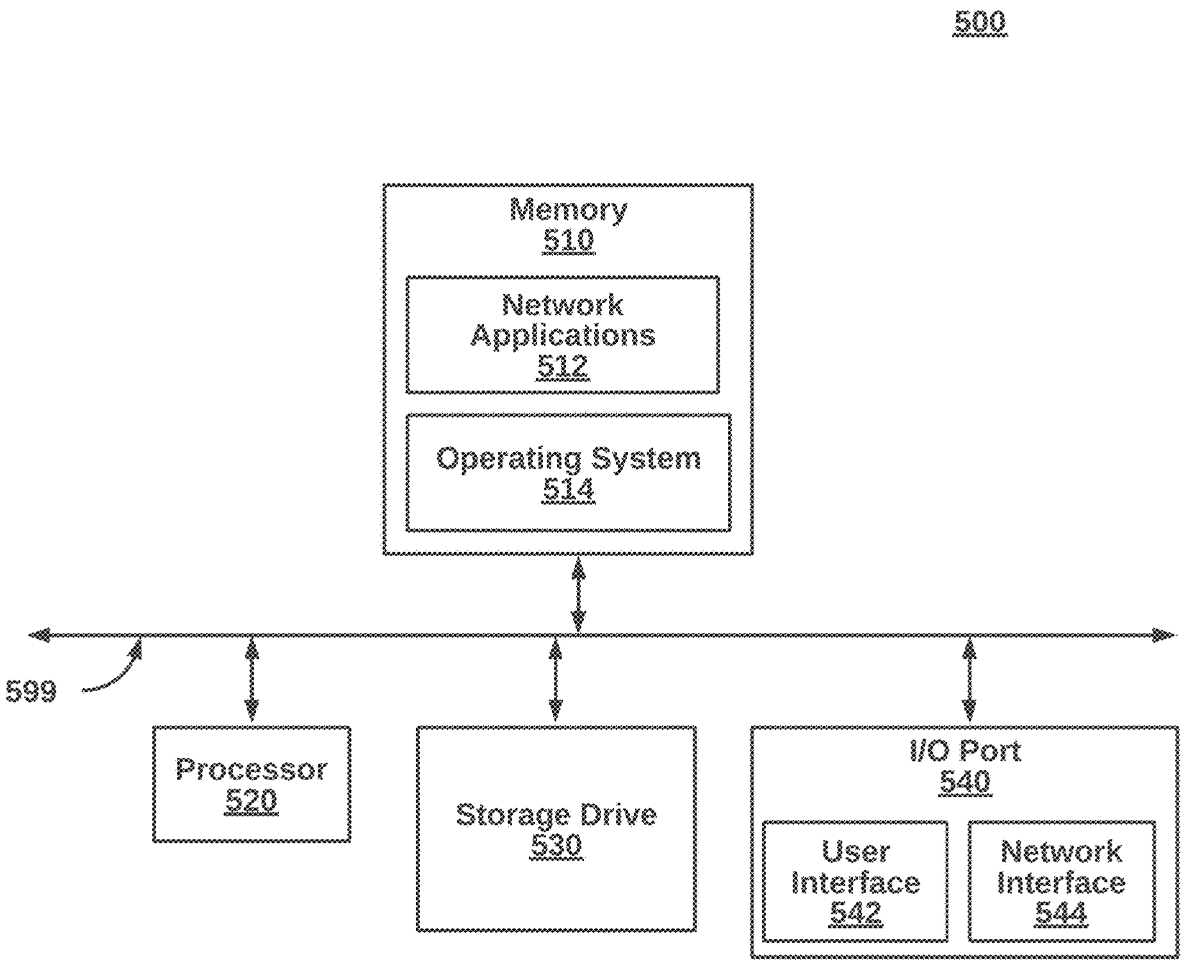
FIG. 5 is a block diagram illustrating an example computing device for machine learning preemptive remediation, of the system of FIG. 1, according to one embodiment.

FIG. 4 is a more detailed flow diagram illustrating the step 310 for preemptively remediating a wireless network with artificial intelligence based on user behavior, according to one embodiment. At step 410, a change of a user device is detected from a wireless connection to the enterprise network to a wired connection to the enterprise network. At step 420, responsive to the detection, a snapshot of network conditions (or user device conditions) relevant to the user device is generated. At step 430, a health check is performed on the network conditions to identify specific network issues negatively affecting the user device. At step 430, a remediation associated with the specific network issues is determined. At step 440, predicting conditions with AI that a different user change will occur based on a later health check revealing similar network conditions to those causing an earlier user switch.

III. Computing Device for Machine Leaning Preemptive Remediation (FIG. 5)

FIG. 5 is a block diagram illustrating a computing device 500 for use in the system 100 of FIG. 1, according to one embodiment. The computing device 500 is a non-limiting example device for implementing each of the components of the system 100, including the remediation server 110, the access point 120 and the station 130. Additionally, the computing device 500 is merely an example implementation itself, since the system 100 can also be fully or partially implemented with laptop computers, tablet computers, smart cell phones, Internet access applications, and the like.

The computing device 500, of the present embodiment, includes a memory 510, a processor 520, a hard drive 530, and an I/O port 540. Each of the components is coupled for electronic communication via a bus 550. Communication can be digital and/or analog, and use any suitable protocol.

The memory 510 further comprises network access applications 512 and an operating system 514. Network access applications can include 512 a web browser, a mobile access application, an access application that uses networking, a remote access application executing locally, a network protocol access application, a network management access application, a network routing access applications, or the like.

The operating system 514 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, or Windows 7-11), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 520 can be a network processor (e.g., optimized for IEEE 802.11), a general-purpose processor, an access application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 520 can be single core, multiple core, or include more than one processing elements. The processor 520 can be disposed on silicon or any other suitable material. The processor 520 can receive and execute instructions and data stored in the memory 510 or the hard drive 530.

The storage device 530 can be any non-volatile type of storage such as a magnetic disc, EEPROM, Flash, or the like. The storage device 530 stores code and data for access applications.

The I/O port 540 further comprises a user interface 542 and a network interface 544. The user interface 542 can output to a display device and receive input from, for example, a keyboard. The network interface 544 connects to a medium such as Ethernet or Wi-Fi for data input and output. In one embodiment, the network interface 544 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C #, Oracle® Java, Javascript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VOIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI Wi-Fi family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

I claim:

1. A computer-implemented method in a network device on an enterprise network that includes a wireless network, for preemptively remediating a wireless network with artificial intelligence (AI) based on user behavior to prevent switching from wireless to wired connections, the method comprising:
- detecting a change of a user device from a wireless connection to the enterprise network to a wired connection to the enterprise network;
- responsive to the detection, generating a snapshot of network conditions to identify specific network issues negatively affecting the user while on the wireless network, by performing a reactive health check relevant to the user device;
- identifying a remediation associated with the specific network issues;
- generating a remediation model with AI that a change by a second user device will occur based on a later health check revealing similar network conditions to the earlier health check;
- performing a preventative health check on network conditions to predict a change by the second user device from the wireless network to the wired network; and
- responsive to the prediction, automatically remediating the specific network issues based on the earlier stored remediation of the earlier health check.

2. The method of claim 1, wherein the snapshot includes conditions of the user device.

3. The method of claim 1, wherein the snapshot includes conditions of an access point.

4. The method of claim 1, wherein the snapshot includes conditions of a plurality of network devices.

5. A non-transitory computer-readable medium in a network device on an enterprise network that includes a wireless network for preemptively remediating a wireless network with artificial intelligence (AI) based on user behavior to prevent switching from wireless to wired connections, the method comprising:
- detecting a change of a user device from a wireless connection to the enterprise network to a wired connection to the enterprise network;
- responsive to the detection, generating a snapshot of network conditions to identify specific network issues negatively affecting the user while on the wireless network, by performing a reactive health check relevant to the user device;
- identifying a remediation associated with the specific network issues;
- generating a remediation model with AI that a change by a second user device will occur based on a later health check revealing similar network conditions to the earlier health check;
- performing a preventative health check on network conditions to predict a change by the second user device from the wireless network to the wired network; and
- responsive to the prediction, automatically remediating the specific network issues based on the earlier stored remediation of the earlier health check.

6. A network device on an enterprise network that includes a wireless network for preemptively remediating a wireless network with artificial intelligence (AI) based on user behavior to prevent switching from wireless to wired connections, the network device comprising:
- a processor;
- a network interface communicatively coupled to the processor and to the WLAN; and
- a memory, communicatively coupled to the processor and storing:
  - a user behavior module to detect a change of a user device from a wireless connection to the enterprise network to a wired connection to the enterprise network;
  - a snapshot capture module to, responsive to the detection, generate a snapshot of network conditions relevant to the user device;
  - a health check module to perform a health check on the network conditions to identify specific network issues negatively affecting the user device;
  - a remediation module to identify a remediation associated with the specific network issues; and
  - an AI prediction module to generate a remediation model with AI that a change by a second user device will occur based on a later health check revealing similar network conditions to the earlier health check, wherein the remediation module performs a preventative health check on network conditions to predict a change by the second user device from the wireless network to the wired network;

wherein the remediation module automatically remediates the specific network issues based on the earlier identified remediation of the earlier health check.

7. The network device of claim 6, wherein the network device comprises an access point.

* * * * *